United States Patent

Yoshikawa

[11] 4,238,151
[45] Dec. 9, 1980

[54] PENTAPRISM MOUNT ASSEMBLY

[75] Inventor: Ryoichi Yoshikawa, Kanagawa, Japan

[73] Assignee: Canon Kabushiki Kaisha, Tokyo, Japan

[21] Appl. No.: 16,335

[22] Filed: Feb. 28, 1979

Related U.S. Application Data

[63] Continuation of Ser. No. 849,799, Nov. 9, 1977, abandoned.

[30] Foreign Application Priority Data

Nov. 24, 1976 [JP] Japan .................................. 51-140925

[51] Int. Cl.³ .................... G03B 7/00; G03B 19/12; G03B 17/20; G03B 13/08
[52] U.S. Cl. ..................................... 354/152; 354/53; 354/224; 354/60 R
[58] Field of Search ............... 354/152, 155, 224, 225, 354/219, 53, 57, 60 R, 55, 56, 59; 248/500, 505; 24/20 CW, 20 R

[56] References Cited

U.S. PATENT DOCUMENTS

| 2,539,581 | 1/1951 | Holden | 248/505 X |
| 2,722,214 | 11/1955 | Borde | 248/500 X |
| 2,729,846 | 1/1956 | Reed | 24/20 CW X |
| 3,218,948 | 11/1965 | Küppenbender | 354/224 |
| 3,732,775 | 5/1973 | Warstat | 354/56 |
| 3,846,805 | 11/1974 | Kiyohara et al. | 354/60 R X |
| 3,999,194 | 12/1976 | Imura et al. | 34/60 R |

FOREIGN PATENT DOCUMENTS

| 494475 | 3/1930 | Fed. Rep. of Germany | 354/219 |
| 1099340 | 2/1961 | Fed. Rep. of Germany | 354/152 |
| 1154713 | 9/1963 | Fed. Rep. of Germany | 354/224 |
| 1174231 | 11/1958 | France | 354/53 |
| 1235779 | 5/1960 | France | 354/224 |
| 1320332 | 1/1963 | France | 354/152 |

Primary Examiner—Donald A. Griffin
Attorney, Agent, or Firm—Toren, McGeady and Stanger

[57] ABSTRACT

A support framework for a pentaprism is provided with hooks so that when a holding plate having resilient portions formed therein is brought into engagement at its eyes with the respective hooks over the pentaprism, it is engaged into the adjusted position by making use of the resilient characteristics of the holding plate.

5 Claims, 13 Drawing Figures

PENTAPRISM MOUNT ASSEMBLY

This a continuation of application Ser. No. 849,799, filed Nov. 9, 1977 and now abandoned.

BACKGROUND OF THE INVENTION

1. Field of the Invention

This invention relates to optical instruments such as photographic cameras having a pentaprism and, more particularly, to a device for retaining the pentaprism in the adjusted position.

2. Description of the Prior Art

To fixedly secure a pentaprism to position within an optical instrument, particularly a photographic camera, the following two main requirements must be fulfilled. In this connection, various improvements have been attempted. (1) When the pentaprism is engaged to a support framework therefor, the holding pressure is directed to both the bottom and rear faces of the pentaprism so that the resulting position of the pentaprism is automatically adjusted with high accuracy, since the bottom and rear faces of the pentaprism are usually designed to serve as the reference faces for such adjustment. (2) The mount assembly tends to hold the pentaprism in the adjusted position so that, after accidental displacement of the pentaprism by application of external shock to the camera, the removal of such shock will result in return of the pentaprism to the initial adjusted position.

In the prior art, the holding means is constructed in the solid form so that a rigid member is placed over the pentaprism and fixedly secured to the camera housing by means of screw fasteners. For shock absorbing purposes, a sponge sheet is inserted into a space between the upper surface of the pentaprism and the rigid member. In another method, a presser plate is placed over the pentaprism and connected through springs to the support framework for the pentaprism so that the pentaprism is retained by the force of the springs.

Recently, however, the prime requisites for photographic cameras are light-weight and small size for convenient and handy use. Since the advent of miniaturization in the production of integrated circuits, semiconductor arrays and printed circuit networks, there is an increasing demand of camera control systems of superior performance which the prior art means and methods of providing pentaprism mounting devices make impossible to achieve. In other words, as the weight and bulk of the camera are decreased, the spaces between the pentaprism and the holding means and between the support member for the pentaprism and the camera housing wall are decreased. Accordingly, the use of the sponge sheet as the shock absorbing means and the springs as the position control means which are necessary in the afore-mentioned conventional pentaprism mount assemblies is not compatible with the requirment of achieving minimization of the weight and bulk of the camera. This requirement when combined with the requirement, for electronic conversion of the camera control system, and also as the resulting mechanism of the camera is made more complicated to occupy an increased proportion of the total space available within the camera housing, it is impossible not to make use of the space between the non-functional faces of the pentaprism, that is, the roof faces and the top panel of the camera housing in arranging the electronic circuit components. For this purpose, the pentaprism must be retained in the efficiency accurately adjusted position, while preserving the space which the electronic circuit components are intended to occupy.

SUMMARY OF THE INVENTION

An object of the present invention is to provide a pentaprism mount assembly for use in an optical instrument which has overcome the above mentioned conventional drawbacks.

Another object of the present invention is to provide a pentaprism mount assembly for use in a photographic camera, said assembly being capable of containing an exposure value display device as arranged adjacent the pentaprism so that the exposure value display can be visible in the field of view of the camera finder.

Still another object of the invention is to provide a novel holding structure for retaining a pentaprism into position within an optical instrument so that after accidental displacement of the pentaprism by shock applied to the instrument from the outside thereof, the removal of such shock permits the pentaprism to automatically return to the initially adjusted or normal position.

In application of this holding structure to a photographic camera, the upper part of the pentaprism casing which would be otherwise necessary to assemble the pentaprism with the support member can be omitted with the resulting space when taken up facilitating minimization of the size of the camera.

The holding structure of the invention formed to have resilient characteristics is modifiable to largely simplified production techniques for single lens reflex cameras, for example.

These and other objects, features and advantages of the present invention will become apparent from the following detailed description of preferred embodiments of the invention taken in conjunction with the accompanying drawings in which:

DESCRIPTION OF THE PREFERRED EMBODIMENTS

Figure 1:
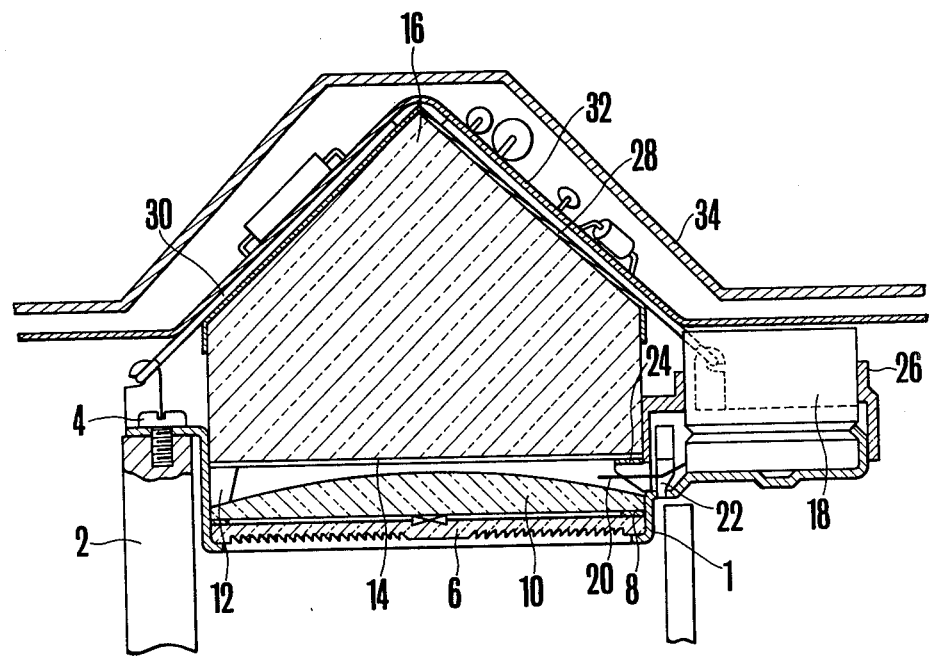
FIG. 1 is a sectional view of one embodiment of a pentaprism mount assembly according to the present invention applied to a single lens reflex camera.
Figure 2:
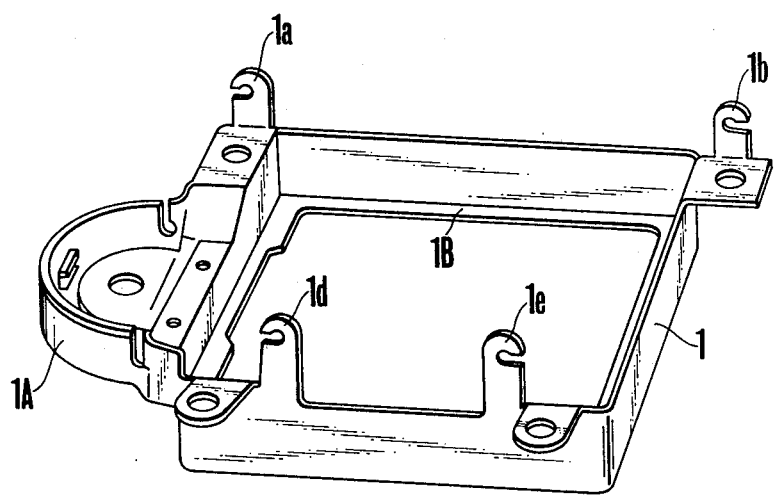
FIG. 2 is a perspective view of the pentaprism support framework of FIG. 1.

Referring to FIGS. 1 to 7 there is shown one embodiment of the present invention including a pentaprism 16 support framework 1 fixedly secured to the camera housing 2 by screw fasteners 4 and which also serves to support a focusing screen 6 and a condenser lens 10. The focusing screen 6 and the condenser lens 10 are separated from each other by a spacer 8 and retained into position against an inturned lateral flange 1B (see FIG. 2) by the weight of the pentaprism 16 and holding pressure for the latter. Positioned between the condenser lens 10 and the bottom surface of the pentaprism 16 are a spacer 12 and a framing aperture plate 14 which defines the effective area of the scene being photographed. In order to display an exposure value in the field of view of the finder, that is, in the opening area of the framing aperture 1B, there is provided a meter 18 having a pointer 20 adjacent the pentaprism 16 and fixedly secured to the pentaprism support framework 1 at a section 1A so that, as the pointer 20 is cooperative with an exposure value scale 24 cut on the flange 14, accurate adjustment of relative position of the pointer 20 to the scale 24 can be assured. This display is illuminated by light as introduced through a light guide 22. In order to prevent particles such as dust from entering the space between the condenser lens 10 and the pentaprism 16 through an opening through which the pointer 20 extends, there is provided a cover 26 overlapping both the meter casing 18 and the mount 1A therefor.

Figure 3:
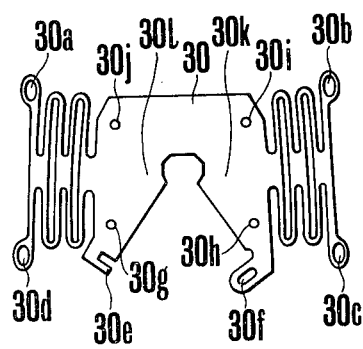
FIG. 3 is a plane view of the pentaprism holding plate of FIG. 1 distended.
Figure 4:
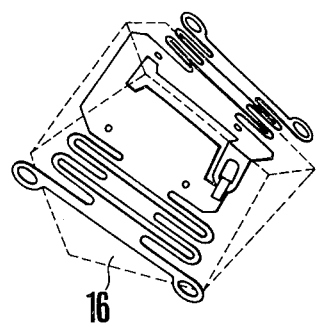
FIG. 4 is a perspective view of the holding plate of FIG. 3 conformed with the pentaprism.

As shown in FIG. 3, a holding plate 30 for the pentaprism 16 is distended as will occur in a step near the end of the production run and has two resilient portions formed therein and arranged in symmetrical relation to each other with respect to the central line in the area thereof and four eyes 30a to 30d formed therein at respective corners thereof. In the final step, the holding plate 30 is pressed to conformance with the shape of the roof surfaces of the pentaprism 16 and held in the once pressed position by engaging a hook 30e in an eye 30f and then bending the hook 30e with the resulting configuration being shown in FIG. 4.

Figure 5:
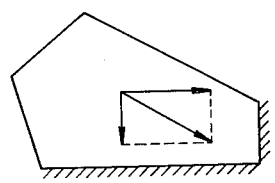
FIG. 5 is a diagram of geometry showing the direction in which the holding pressure is applied to the pentaprism.
Figure 6:
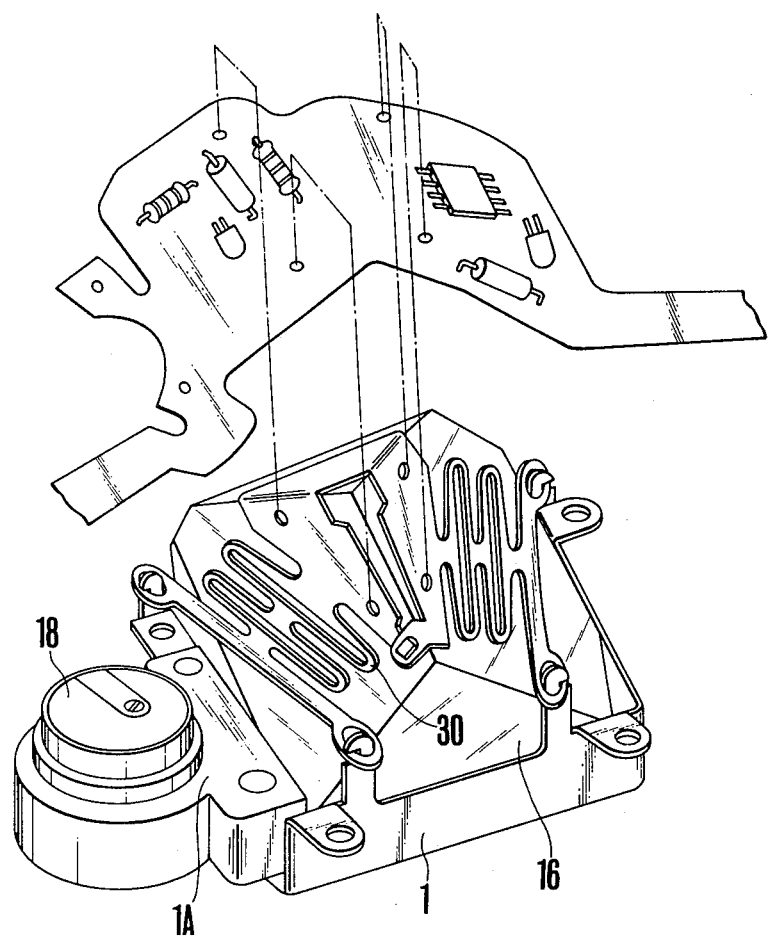
FIG. 6 is an exploded perspective view of a printed circuit plate shown about to be attached to the pentaprism mount assembly of FIGS. 1 to 5.

When the holding plate 30 is brought into engagement at its eyes 30a to 30d with respective hooks 1a to 1d upwardly extending from the support framework 1 over the roof surfaces of the pentaprism 16 as shown in FIG. 6, the focusing screen 6, the condenser lens 10 and the pentaprism 16 are assembled, adjusted and held into position, and the holding plate 30 tends to hold the pentaprism 16 in the once adjusted position as the holding pressure is acted thereon in a manner shown in FIG. 5. It is well to mention here that the holding plate 30 is usually made of phosphor bronze though it is possible to use some other materials having resilient characteristics such as synthetic resins and rubbers, for example, polyacetal and polycarbonate resins.

Returning now to FIG. 1, which is illustrative for the purpose of achieving minimization of the space between the holding plate 30 and the pentaprism 16 because of existence of only a thin protecting sheet 28 therebetween, the space between the pentaprism mount assembly and the top panel 34 of the camera housing is correspondingly increased to such an extent that all or some of the various components of the camera control circuit may be mounted therein. For this purpose, a printed circuit substrate 32 is conformed to the holding plate 30 and carries the various circuit components such as resistors, condensers, semiconductor devices and integrated circuit elements. To mount the substrate 32 on the holding plate 30, it is possible to utilize the four holes of the substrate 32 which were first used in automatically testing the various circuit components, provided that the holding plate 30 has four holes 30g–30j arranged to be aligned with the respective holes of the substrate 32 when they are assembled and fastened to each other by means of pins, for example, engaged in the holes, as shown in FIG. 6.

Figure 7:
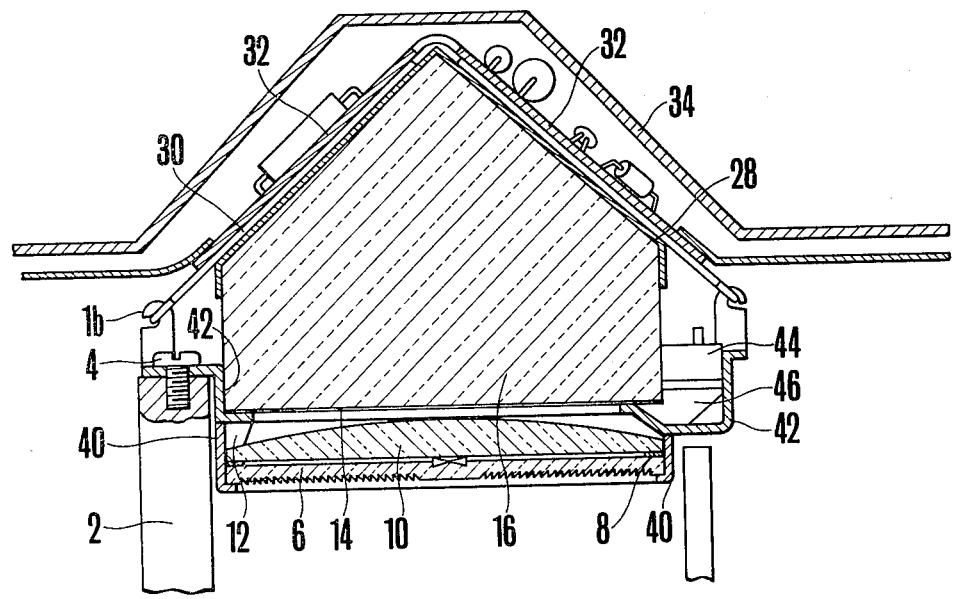
FIG. 7 is a sectional view similar to FIG. 1 with modification of the pentaprism support framework.

FIG. 7 shows another embodiment of the present invention in which the support framework for the pentaprism is constructed separate from that for the focusing screen and condenser lens which is movably mounted to permit interchange of the focusing screen. The support framework for the focusing screen 6 and the condenser lens 10 is indicated at 40, and the support frame for the pentaprism 16 is indicated at 42. The exposure value display means in the form of a light-emitting diode array 44 is mounted on the pentaprism support framework 42 together with a prism 46 through which the exposure value display can be seen in the field of view of the finder.

Figure 8:
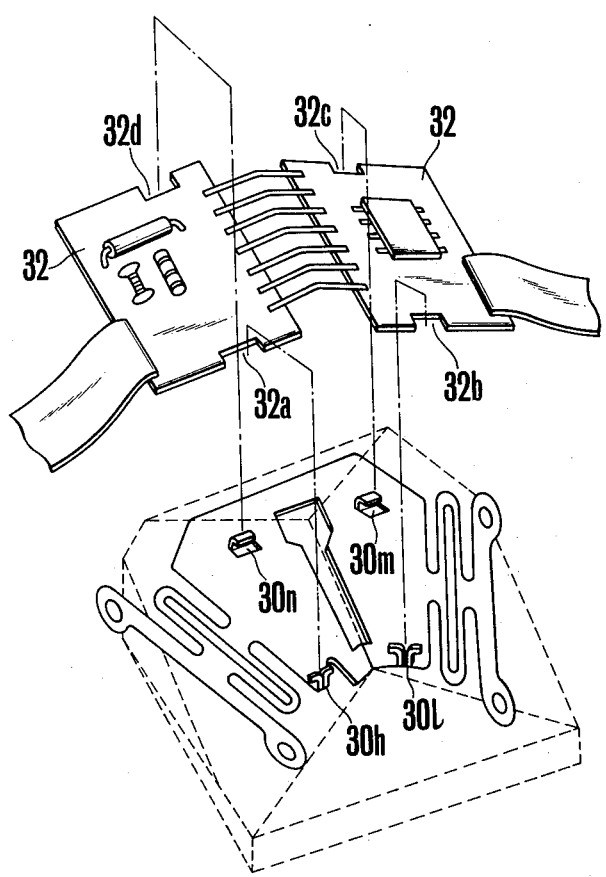
FIG. 8 is an exploded perspective view of another example of application of the present invention.

FIG. 8 shows an alternate method of assembling the holding plate 30 and the printed circuit substrate 32 which is different from that of FIG. 6 in that the front two holes 30i and 30j are substituted by rearwardly bent-off fingers 30m and 30n, and the rear two holes 30g and 30h are substituted by hooked flanges 30k and 30l extending from the rear edges of the plate 30, while the substrate 32 is provided with four rectangular recesses 32a to 32d arranged upon engagement with the flanges and fingers 30k to 30n respectively to fixedly secure the substrate 32 to the holding plate 30, as the two parts of each of the flanges 30k and 30l tend to expand at their heads after the substrate recesses 32a and 32b have received the hooked flanges 30k and 30l respectively.

Figure 9:
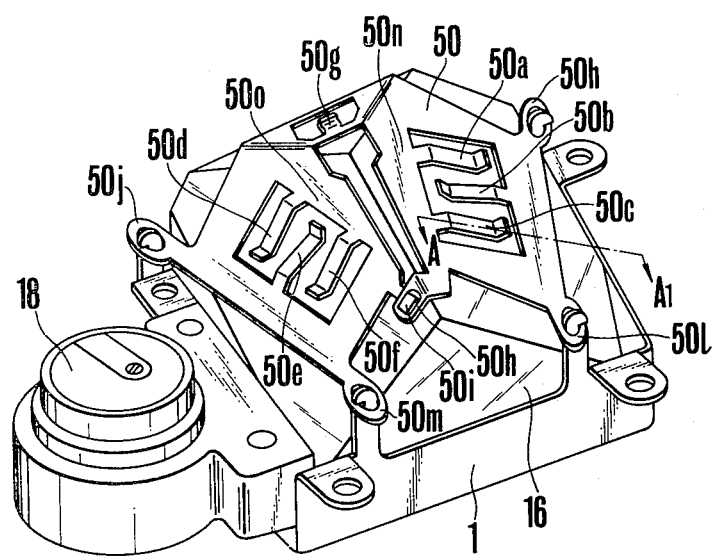
FIG. 9 is a perspective view of another example of the pentaprism holding plate of the invention.
Figure 10:
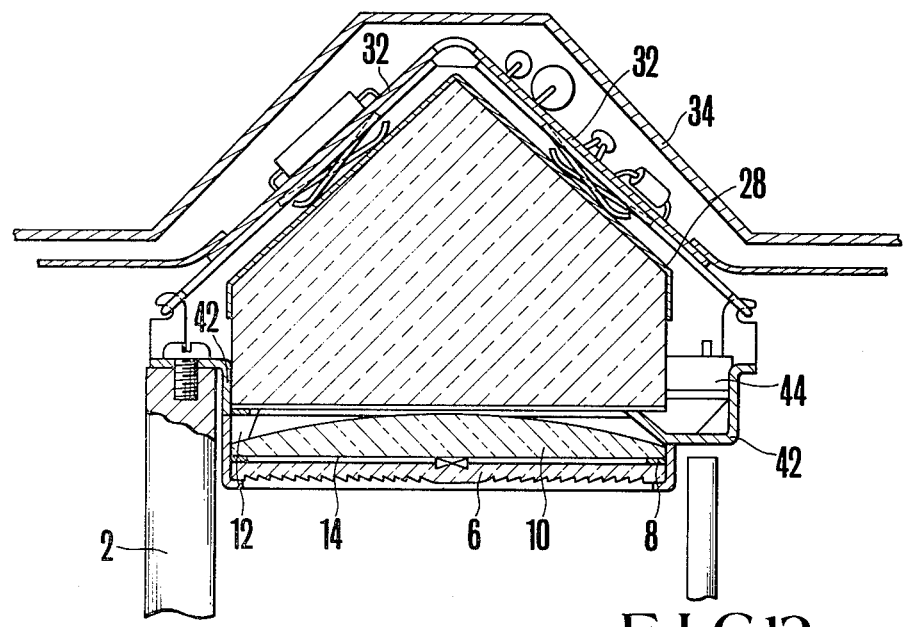
FIG. 10 is a sectional view similar to FIG. 7 in the support framework but different therefrom as employing the holding plate of FIG. 9.
Figure 11:
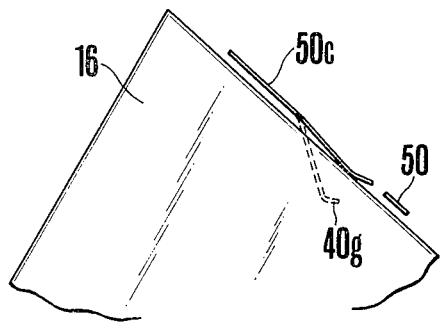
FIG. 11 is a diagram of geometry showing the mode of action of the holding pressure in the pentaprism mount assembly of FIGS. 9 and 10.

FIGS. 9 and 10 shows another configuration example of the resilient parts of the holding plate 50 cooperative with the pentaprism 16 to provide a slippery form of dynamic clamp as compared with the FIGS. 1 to 7 embodiment. The right- and left-hand side parts 50n and 50o of the holding plate 50 each have three fingers 50a to 50c and 50d to 50f respectively evenly spaced from each other and first inturned and then almost rectangularly bent off at their ends as shown by phantom lines 40g in FIG. 11, so that when the holding plate 50 is brought into engagement at its eyes 50j to 50m with the hooks 1a to 1d over the "roof" surfaces of the pentaprism 16, a reversing force is exerted in each of the fingers 50a to 50f to establish intimate contact between the bottom surface of the pentaprism 16 and the inturned lateral flange of the support framework 42. The front triangular part of the holding plate 50 is also provided with a finger 50g of similar shape to that of the fingers 50a to 50f and which functions to push the pentaprism 16 rearwardly so that intimate contact is established between the rear surface of the pentaprism 16 and the rear wall of the support framework 42.

Figure 12:
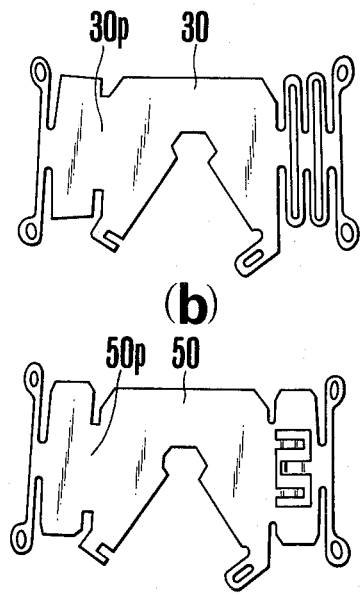
FIGS. 12(a) and 12(b) are plane views showing asymmetrical arrangement of the resilient portions of the holding plates as modified from those of FIGS. 3 and 9, respectively.

In order to increase stability of the pentaprism 16 against displacement from the once adjusted position, it is preferred to configure the holding plate to asymmetry as shown in FIGS. 12(a) and 12(b) with the areas 30p and 50p otherwise provided with respective resilient means similar to those shown on the respective opposite sides.

Here again it may be noted that when the holding plate 50 of FIG. 9 is made of synthetic resin, the angle of reversible movement of the individual fingers 50a to 50g is necessarily smaller than that when metal is used, and further that the holding pressure can be varied as desired employing a different material in making the holding plate 30 or 50.

It will be seen from the foregoing that the pentaprism mounting apparatus and method of the present invention takes a novel form wherein the resilient characteristics of the holding plate is utilized to make allowances for optical deficiencies of the pentaprism. Even when shock is given to the camera employing the pentaprism mounting apparatus of the invention, the pentaprism will later return to the initially adjusted position. With the holding plate designed to have a sufficiently small thickness by suitable selection of a material which the plate is made of, it is possible to create a space between the holding plate and the top panel of the housing of the camera with dimensions large enough to accommodate the electronic circuit device therein. Among the advantages is the advantage that accurate conrol of relative position of the printed circuit network substrate to the pentaprism holding plate can be made to facilitate automatic procedure of testing the various function of the printed circuit network substrate.

Further, the pentaprism, framing aperture plate, condenser lens and focusing screen may be assembled and held in unison, thereby low cost production techniques are realized.

What is claimed is:

1. A device for holding a pentaprism of a camera, comprising:
   (a) a pentaprism support framework including a mounting part for securing the framework directly or indirectly to a camera body, a carrying part for setting the pentaprism at a predetermined optical position within the camera and an engaging part for holding the pentaprism in place; and
   (b) a pentaprism pressing plate for holding said pentaprism at said pentaprism support framework, the pressing plate being formed similar to the shape of the roof surface to fit with the roof surface of the pentaprism, and having a pushing part which presses the pentaprism against the pentaprism support framework, an engaging part which engages with the engagement part of the pentaprism support framework, and a spring part being formed in continuous fashion from said pushing part and having a spring characteristic to push the pentaprism at least in the neighboring two directions by a component of force of the spring part at a predetermined optical position of the camera when the engagement parts are engaged with each other and continuous.

2. A device according to claim 1, wherein said pentaprism pressing plate is made of a metal material.

3. A device according to claim 1, wherein said spring part of pentaprism pressing plate also acts as said pushing face.

4. A device for holding a pentaprism of a camera, comprising:
   (a) a pentaprism support framework including a mounting part for securing the framework directly or indirectly to a camera body, a carrying part for setting the pentaprism at a predetermined optical position within the camera and an engaging part for holding the pentaprism in place; and
   (b) a pentaprism pressing plate for holding said pentaprism at said pentaprism support framework, the pressing plate being formed from one flat metal sheet and having a shape similar to the shape of the roof surface to fit with the roof surface of the pentaprism, and having a pushing part which presses the pentaprism against the pentaprism support framework, an engaging part which engages with the engagement part of the pentaprism support framework, and a spring part being formed in continuous fashion from said pushing part and having a spring characteristic to push the pentaprism at least in the neighboring two directions by a component of force of the spring part at a predetermined optical position of the camera when the engagement parts are engaged with each other and continuous, and wherein said pentaprism pressing plate has a hooked portion and an aperture portion which are arranged with each other when the pressing plate is conformed to the shape of the roof surface of the pentaprism.

5. A pentaprism unit for a single lens reflex camera, comprising:
   (a) pentaprism support framework including a mounting part secured directly or indirectly to a body of said camera, a carrying part for setting an optical element including a pentaprism at a predetermined optical position within the camera, an engaging part provided for holding said pentaprism and said optical element in place and a meter holding part provided for carrying a meter; and
   (b) a holding plate which holds said pentaprism and said optical element at said pentaprism support framework, said holding plate being formed similar to the shape of the roof surface of the pentaprism and being attached to a roof surface of the pentaprism, and having an engagement part which engages with the engaging part of the pentaprism support framework, and a spring part being formed in continuous fashion from the roof surface of the pentaprism and having a spring characteristic to push the pentaprism at least in the neighboring two directions by a component of force of the spring part at a predetermined optical position within the camera.

* * * * *